United States Patent [19]

Nausedas

[11] Patent Number: 4,489,460
[45] Date of Patent: Dec. 25, 1984

[54] STUFFING METHOD AND APPARATUS

[75] Inventor: Joseph A. Nausedas, Oak Forest, Ill.

[73] Assignee: Union Carbide Corporation, Danbury, Conn.

[21] Appl. No.: 481,031

[22] Filed: Mar. 31, 1983

[51] Int. Cl.³ .............................................. A22C 11/02
[52] U.S. Cl. ............................................ 17/49; 17/33
[58] Field of Search .................... 17/1 F, 33, 41, 49; 53/576, 577, 567, 581

[56] References Cited

U.S. PATENT DOCUMENTS

| 661,130 | 11/1900 | Pape . | |
|---|---|---|---|
| 792,650 | 6/1905 | Cordes . | |
| 1,302,194 | 4/1919 | Mayer | 17/41 |
| 1,745,254 | 1/1930 | Green . | |
| 2,168,693 | 8/1939 | Walter | 17/33 |
| 3,115,668 | 12/1963 | Townsend | 17/33 |
| 3,140,509 | 7/1964 | Müller | 17/33 |
| 3,191,222 | 6/1965 | Townsend | 17/33 |
| 3,964,236 | 6/1976 | Smith | 17/41 |
| 4,017,941 | 4/1977 | Raudys et al. | 17/41 |
| 4,142,273 | 3/1979 | Gay | 17/41 |
| 4,343,603 | 8/1982 | Pavlow et al. | 425/114 |

FOREIGN PATENT DOCUMENTS

| 2420202 | 11/1975 | Fed. Rep. of Germany | 17/33 |
|---|---|---|---|
| 2910476 | 9/1980 | Fed. Rep. of Germany | 17/41 |
| 2934861 | 3/1981 | Fed. Rep. of Germany | 17/41 |
| 918250 | 2/1963 | United Kingdom . | |

Primary Examiner—Nicholas P. Godici
Assistant Examiner—Kurt Rowan
Attorney, Agent, or Firm—Roger Aceto

[57] ABSTRACT

An improved high speed stuffing machine for forming links such as frankfurters. The permanent stuffing horn of a conventional link stuffing machine is dispensed with, and apparatus is provided for utilizing highly compacted shirred casing carried directly on a disposable core, wherein the core serves as a rotatable stuffing horn. A roller chuck is provided for engaging and rotating the cored casing article for purposes of linking, and resisting the thrust of the core due to emulsion flow while providing an emulsion seal between the casing article and chuck to prevent backflow of emulsion. The aft end of the core is received in a quick connect emulsion discharge which provides a bearing surface and a rotating emulsion seal to allow the core to rotate while the discharge remains stationary. The cored high density casing article allows the casing length to be increased by an integral multiple over conventional practice, which results in significant economies in the high speed production of linked sausages.

38 Claims, 12 Drawing Figures

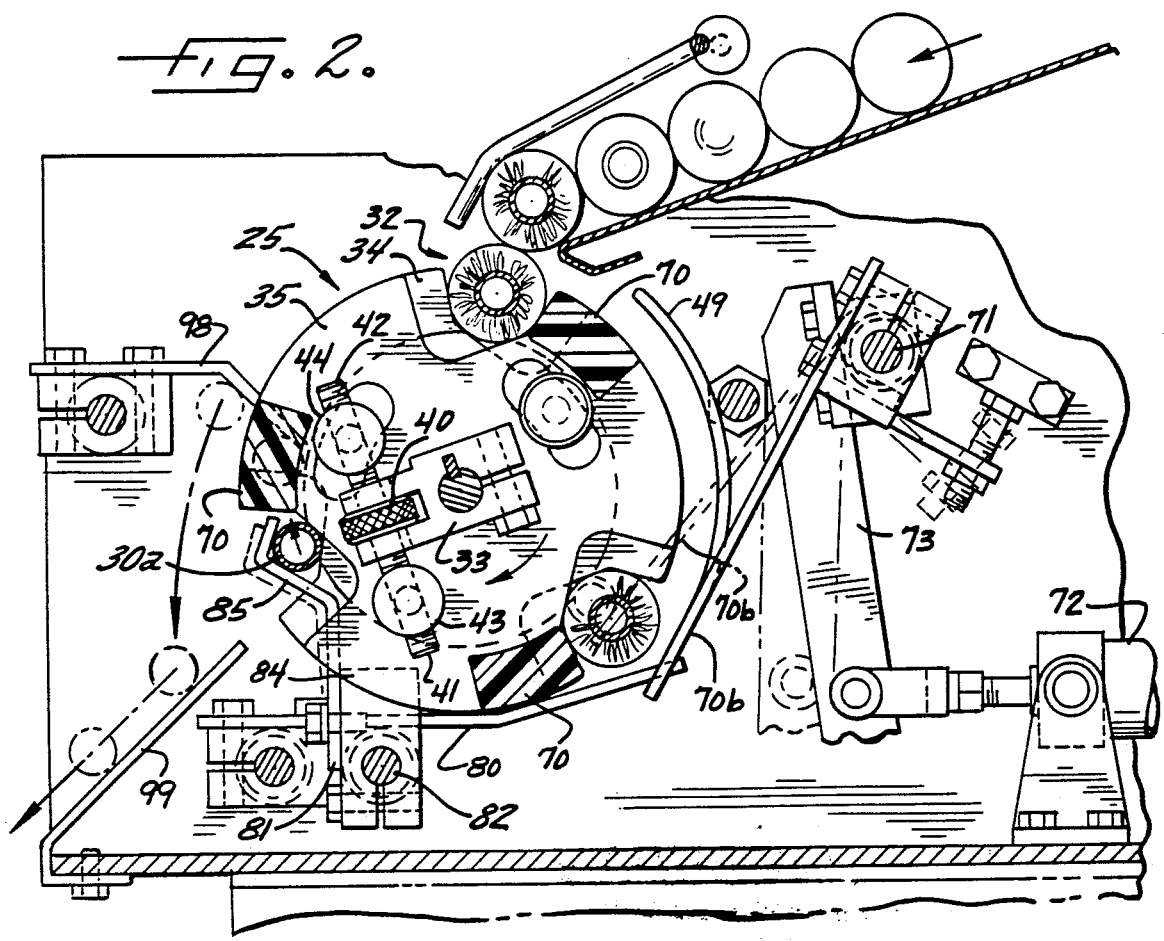
Fig. 2.
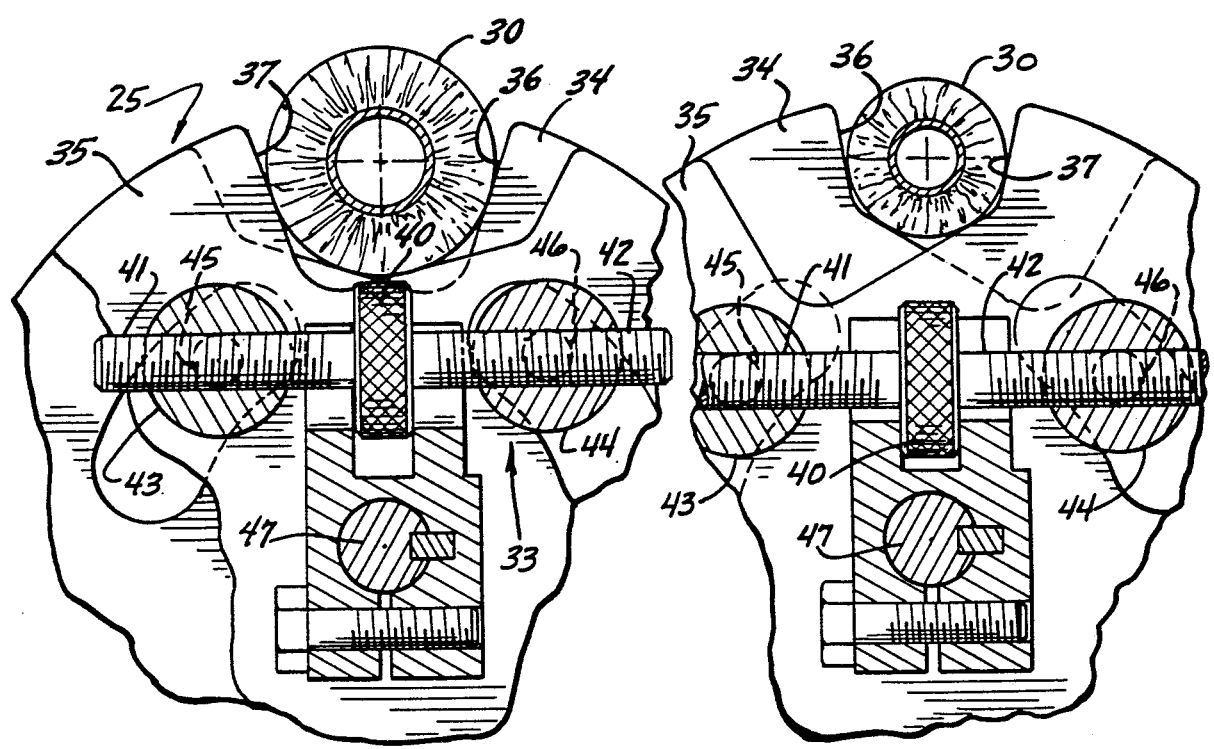
Fig. 3a.
Fig. 3b.

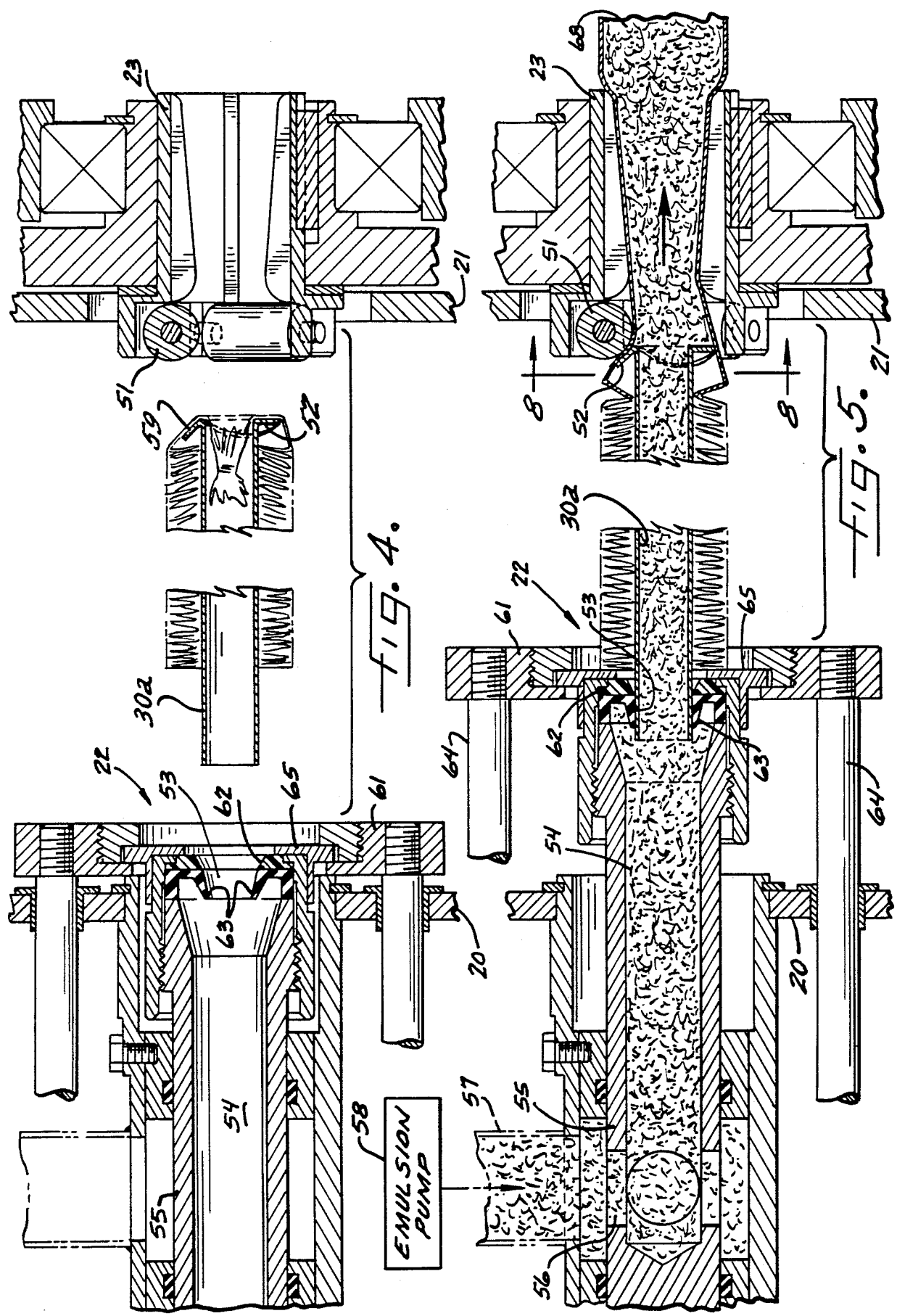

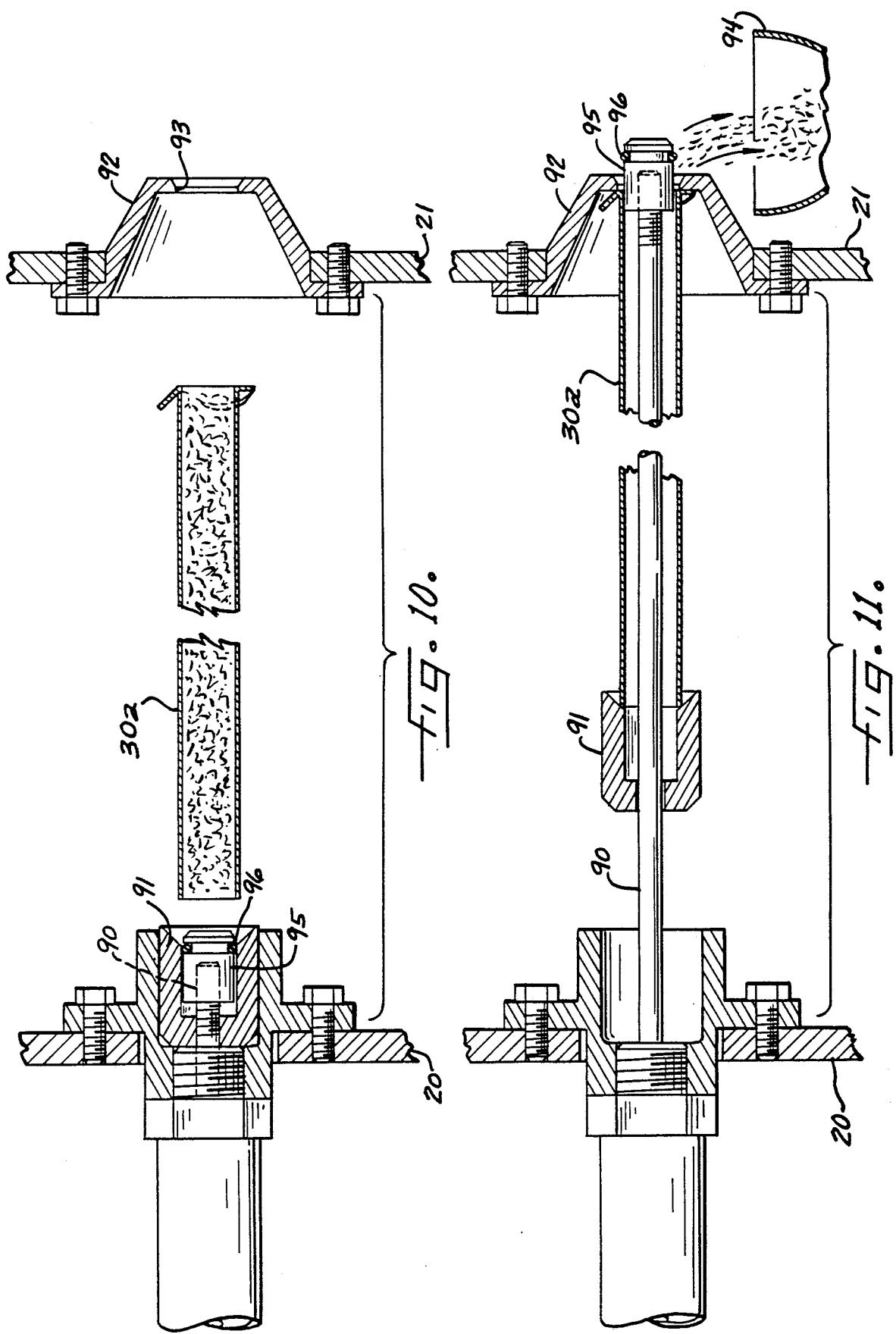

STUFFING METHOD AND APPARATUS

This invention relates to stuffing machines, and more particularly to an improvement in stuffing machines for high speed production of linked sausages such as frankfurters.

One widely accepted high speed stuffing machine for small diameter linked sausages is the "Frank-A-Matic" (registered trademark of Townsend Engineering Company), described generally in U.S. Pat. No. 3,115 668. That machine is configured to automatically load a shirred casing stick from a hopper, to insert a reciprocatable stuffing horn through the bore of the casing stick positioning the discharge end of the stuffing horn near a rotating chuck, to initiate the flow of emulsion causing stuffed casing to pass through the rotating chuck to a linker capable of producing links of specified size, and to hang the stuffed product on a looper from which the links can be removed by an operator In practice, each user of such a machine adopts a casing stick size (unshirred casing length and casing diameter) compatible with the processing operation which he employs. Typically, the links are removed from a looper by means of a smoke stick, and the smoke stick carrying a plurality of linked sausages is then entered into the processing operation for smoking, cooking and chilling. The number of links which can be accommodated on a smoke stick for a particular processor determines the length of shirred casing which should be stuffed per machine cycle. More particularly, the machine automatically begins stuffing the product as soon as a new casing stick is loaded and the stuffing horn reciprocated into position. However, after the casing is expended (typically in 45 seconds or less), the operator must tie off both the aft and the fore end of the casing, strip out whatever emulsion remains in the tail and the lead end of the casing, and attach the ends of the casing to some part of the looped, stuffed casing to prevent the links from un-twisting, before carrying the link-laden smoke stick to the smoke house. Shirred stick lengths are now chosen, except in small sizes, to provide the maximum casing length that a smoke stick can handle without crowding the adjacent hanging stuffed lengths so close together that touch marks would occur. It would be of little practical value to increase the length of casing in a shirred stick by 20% or 30% or even 60% in such an operation, since the extra casing would only partly fill an additional smoke stick, and this would be undesirable.

Means can be devised to transport two or more smoke sticks to the smokehouse simultaneously to save travel, and more importantly, if the links can remain connected from one stick to the other, to save tying off and stripping time. However, to make that operation practical would require an increase in casing length by some integral multiple (e.g., a factor of two or three) of the basic casing length in use at the particular processing house. Such an increase is achievable by use of cored high density shirred casing as described and claimed in Mahoney et al. U.S. application Ser. No. 363,851, filed Apr. 5, 1982, and assigned to the same assignee as the present invention. Thus, if the amount of casing per casing stick is increased by a factor of two or three, the tying-off operation would be necessary after only every two or three smoke sticks, rather than each smoke stick, and a plurality of smoke sticks, such as two or three, could be simultaneously transported to the smokehouse, saving a measurable amount of time and labor as well as wasted casing and emulsion lost in stripping. Many multiple stuffing machine processing houses operate with excess machine capacity in order to meet, under worst case conditions, the given number of pounds of linked sausages per hour requirement necessary to keep the smokehouse running efficiently. The above described savings in tie-off, stripping and transport time, as well as other advantages to be discussed below, have the potential to provide an adequate safety margin with one fewer stuffing machine.

In view of the foregoing, it is a general aim of the present invention to provide the advantages of cored high density casing to the high speed production of linked sausages such as frankfurters.

More particularly, it is an object of the present invention to adapt the Frank-A-Matic type high speed link sausage stuffing machine for greater throughput by optimizing such machine for use with cored high density casing.

Other objects and advantages will become apparent upon consideration of the following detailed description in conjunction with the drawings, in which:

FIG. 2 is a view taken along the line 2—2 of FIG. 1 showing the casing article carrier;

FIGS. 3a and 3b are views taken along line 3—3 of FIG. 1 which illustrate the carrier, adjusted to accommodate cored casing articles of different sizes;

FIG. 4 is a view taken along the line 4—4 of FIG. 1 showing a casing article in the stuff position but prior to being chucked up;

FIG. 5 is a similar view showing the casing article during stuffing;

FIG. 10 is a view taken along the line 10—10 of FIG. 1 showing a spent core indexed into the stripping position; and FIG. 11 is a similar view showing emulsion being stripped from the spent core.

While the invention will be described in connection with a preferred embodiment, there is no intent to limit it to that embodiment. On the contrary, the intent is to cover all alternatives, modifications and equivalents included within the spirit and scope of the invention as defined by the appended claims.

Figure 1:
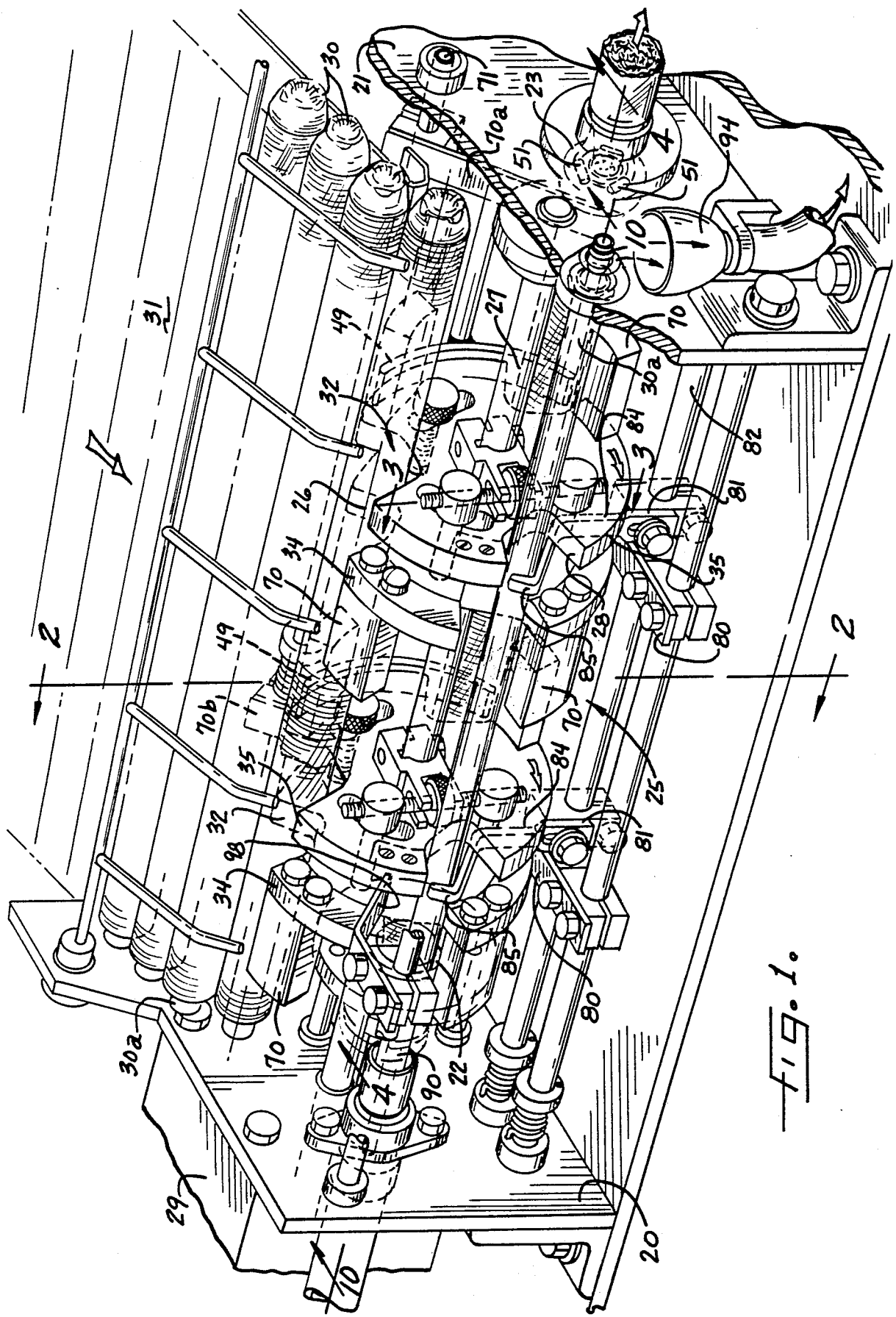
FIG. 1 is a perspective view showing stuffing machine modification apparatus exemplifying the present invention.

Turning now to the drawings, FIG. 1 shows an adapter for a high speed link stuffing machine of the general type illustrated in the aforementioned U.S. Pat. No. 3,115,668. Typical embodiments of the machine illustrated in that patent have a stuffing horn which is somewhat less than two feet in length, and is reciprocated to allow loading of an uncored shirred casing stick. The stuffing horn is inserted through the bore of the casing stick to position its discharge end near a rotating chuck which cooperates with a linker to stuff links of predetermined size. The casing length in the stick ranges typically from about 55 feet to 160 feet, and the machine cycle is such that the stick is expended and the sausage is stuffed and linked in substantially less than a minute, typically 45 seconds for the longest casing length. Shirred casing sticks carrying that length of casing, typically 21 inches or less in length, are fed to the machine from a magazine, and the machine automatically cycles to stuff the casing length, to withdraw the horn and terminate supply of emulsion upon completion of stuffing a casing stick, to load a new casing stick into position for the next cycle, then to reinsert the stuffing horn through the bore of the new casing stick prior to initiating a new stuffing cycle. The operator expends a significant amount of time and effort in tying off the ends of the stuffed linked length of sausages, stripping emulsion from the ends, tying the ends to some part of the looped, stuffed casing to prevent unlinking of the sausages, and carrying the length of links on a smoke stick to the smokehouse for further processing.

In accordance with the invention, means are provided for accommodating such a high speed link sausage stuffing machine to a casing article capable of providing a plurality (integral multiple) of "smoke stick length" links to reduce by an integral multiple the number of tie-off operations required, as well as to provide a plurality of "smoke stick length" sausage links for simultaneous transport to the smokehouse. More particularly, machine modifications, to be described in detail below, accommodate the use of cored high density shirred casing as described and claimed in the aforementioned Mahoney et al. U.S. application. The particular configuration of the casing article used with the instant apparatus is described and claimed in concurrently filed Nausedas application Ser. No. 583,317, filed Feb. 24, 1984, also assigned to the same assignee as the present invention.

As illustrated in FIG. 1, the majority of the elements of the adapter apparatus are disposed between a pair of end plates 20, 21, respectively associated with an emulsion discharge 22, and a rotating chuck 23 which cooperates with a conventional linking mechanism (not shown). Carrier means 25 are provided for handling the casing article and indexing it between three operating positions, namely, a load position 26, a stuff position 27, and a strip position 28. The carrier means 25 cooperates with various guides to be described below and other casing stick handling elements to assure proper indexing and positioning of the casing stick for the various operations.

A supply of cored casing stick articles 30, schematically represented by hopper 31, is positioned for automatic feeding of the articles 30 to the carrier 25. The hopper 31 or other supply source is arranged to supply cored casing articles, one at a time, to the carrier, particularly to the pair of carrier notches 32 disposed in the load position 26.

Referring to FIG. 2, there is illustrated the shape of an exemplary carrier notch 32 along with means 33 for adjusting the size of the notch to accommodate a range of casing stick diameters. The notch 32 is formed by two identically shaped opposite-hand discs 34, 35 placed in face-to-face relation to form opposed sides of the notches 32 (see FIGS. 3a and 3b). It is seen that each notch includes an upper sharply inclined portion 36 and a lower lesser inclined portion 37, respectively adapted to accommodate a casing article in its two forms, namely, a core carrying a casing supply, and the spent core having had its casing supply depleted.

FIG. 3a shows a comparatively large cored casing article 30 carried within the properly adjusted notches and engaging both the walls 36, 37 and floor of the notch. FIG. 3b shows a comparatively smaller casing article 30 similarly engaged by proper adjustment of the carrier. Note that the location of the axis of the casing article remains unchanged, regardless of the diameter of the casing article. FIGS. 1 and 2, by way of contrast show the spent core 30a in the strip position 28, engaging only the notch floor. As will become more apparent, the position of the article or core within the machine must be maintained with reasonable accuracy in order to assure proper interaction between the machine components and the positioned casing article or core. The illustrated notch configuration is a significant factor in accurately positioning the casing article or core for the respective operations.

As noted above, adjustment means are provided for altering the notch size to accommodate a range of casing article diameters. More particularly, referring to FIGS. 2, 3a and 3b, there is shown an adjustment mechanism 33 including a knurled knob 40 having oppositely threaded shanks 41, 42 engaged in threaded nuts 43, 44. The nuts in turn are secured by means of rotatably-fixed shafts 45, 46 to respective ones of the opposed discs 34, 35. It is seen that shaft 45 secures the nut 43 to disc 35, whereas shaft 46 secures nut 44 to disc 34. Thus, rotation of the knurled knob will move the shafts either further apart or closer together, carrying the attached discs in the same direction, to either increase or decrease the size of the notch. The adjustment mechanism 33 is itself keyed to the shaft 47 on which the carrier indexes, and thus carries the respective pairs of discs about the indexing axis. In practice, the carrier is adjusted by inserting a cored casing article of the size to be utilized that day, into the notches which are located in the load position. The adjustment mechanisms 33 are then operated until the notches engage the exterior of the casing article to bring the article axis into alignment with the machine stuffing axis, with sufficient freedom to allow rotation. The lower portion of the notch (as best seen in FIG. 2) is configured to accommodate the spent core after the casing is stuffed out, and does not require further adjustment to align the axis of the spent core with the axis of the emulsion stripping mechanism. It is to be noted that the machine stuffing axis and the machine stripping axis are located at different radial distances from the axis of the carrier mechanism.

Returning to FIG. 1, it is seen that after a cored casing article is in the load position 26, an indexing mechanism 29, which can be of conventional construction, indexes the carrier 120 degrees to locate a new set of notches in the load position, while bringing the notches with loaded casing article 30 to the stuff position 27. Cooperating with the notches and the carrier 25 are a set of arcuate guides 49 which retain the cored casing article within the notches 32 as the carrier is indexed to the stuff position.

Those familiar with the conventional link stuffing machine of the type considered herein will recall that prior to initiating the stuffing of the casing stick, it was necessary to insert a stuffing horn almost two feet in length through the bore of an uncored shirred casing stick. During stuffing, the rotating chuck which cooperates with the linker caused the uncored casing stick to rotate on the stuffing horn. Those operations at times presented problems if the casing sticks were not of very high quality. If a casing stick lacked sufficient coherency or was bent or broken, it was often difficult to insert the stuffing horn through the bore without further damaging the casing stick, such as by tearing inner pleats or the like. Even if it were possible to insert the stuffing horn through the bore of a slightly defective casing stick, at times the casing stick would bind on the horn, preventing the necessary casing stick rotation and ultimately breaking the casing.

Those and other problems are avoided by the present invention in accommodating the stuffing machine to the use of cored high density casing. More particularly, the core 30a of the cored high density casing article 30, itself serves as the stuffing horn for the machine and can be disposed of after the casing supply is depleted. Since the core provides support for the shirred casing supply, coherency problems as well as bent or broken sticks are eliminated. Furthermore, since there is no need to insert a stuffing horn through the casing bore, it is possible to either increase the diameter of the stuffing horn, increase the amount of casing supply in a given stick length, or often to accomplish both. Thus, it becomes practical to achieve the integral multiple increase in casing length discussed above with the resulting advantages.

In accordance with the invention, the rotatable chuck 23 is provided with engagement means, shown herein as a plurality of rollers 51 for engaging a complementary flange 52 on the cored high density casing article to cause rotation of the entire cored high density casing article about its longitudinal axis, thereby to allow the rotating chuck to cooperate with the linker to form a plurality of linked sausages. In addition, a "quick connect" emulsion discharge generally indicated at 22 is provided with bearing and seal means for engaging the core of the cored high density casing article to allow the chuck-driven rotation of the casing article. By quick connect is meant an engagement mechanism which operates automatically without undue complexity or human intervention.

Referring to FIGS. 4 and 5, it is seen that the emulsion discharge, generally indicated 22, 53 is translatable from a retracted position shown in FIG. 4 to an operating position shown in FIG. 5. The discharge 22 has an annular opening 53 which is connected to a conduit 54 which is an element of a sliding valve 55 cooperating with an orifice 56 connected by means of conduit 57 to an emulsion pump 58. Thus, with the apparatus in the FIG. 5 operating position, emulsion supplied from the pump 58 through the conduit 57 passes through orifice 56 into conduit 54 to the discharge 22. When the discharge 22 is withdrawn to the retracted FIG. 4 position, the orifice 56 is out of register with conduit 57, terminating supply of emulsion from the pump 58.

When the carrier 25 is indexing a new casing article from the load position 26 to the stuff position 27, the discharge is in the retracted FIG. 4 position. There is thus adequate room between the retracted discharge 22 and the roller chuck 23 to allow the carrier 25 to align the axis of the casing article with the common axis of the discharge 22 and roller chuck 23. The above described adjustment of the carrier notches 32 as well as the control of the indexing mechanism 29, assures the alignment of the machine stuffing axis with the axis of the casing article.

Having indexed a new casing article into the stuff position, a pneumatic cylinder (not shown) advances the emulsion discharge 22 to the FIG. 5 operating position. During the course of that advance, the discharge 22 contacts the aft end of the tubular core 30a, carrying the flange 52 at the fore end of the core into contact with the roller chuck 23. In practicing this aspect of the invention, the roller chuck 23 and flange 52 are configured to provide a self-engaging drive for the casing article, and an emulsion seal to prevent unacceptable emulsion back flow.

Figure 6:
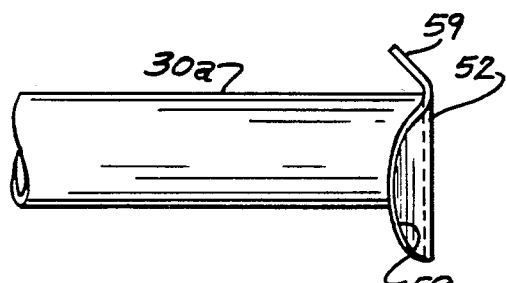
FIG. 6 is a partial elevation illustrating the fore end of a core.
Figure 7:
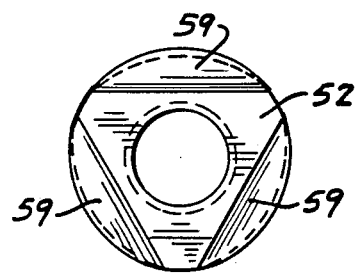
FIG. 7 is an end elevation of the casing flange of FIG. 6.
Figure 8:
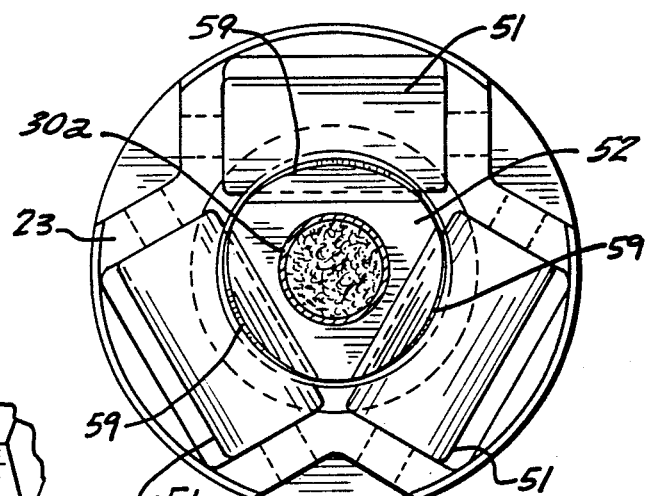
FIG. 8 is an enlarged view taken along the line 8—8 of FIG. 5 showing the roller chuck and core flange.

Referring to FIGS. 6-8, there are shown additional details of the roller chuck and complementary core flange. As noted above, the cored casing article is described and claimed in the aforementioned Nausedas application. Briefly, the fore end of the core 30a ends in a flange 52 oriented in a plane generally perpendicular to the longitudinal axis of the core. The periphery of the flange 52 includes a plurality of flattened portions 59 which are bent rearward over the tubular body of the core in a direction towards the aft end of the core. In the illustrated embodiment, three flattened portions are provided by way of example.

The roller chuck 23, in addition to conventional drive elements and casing engaging fins described in the aforementioned U.S. Pat. No. 3,115,668, is provided with bearing means shown herein as a plurality of rollers 51 for engaging the flattened portions of the core flange, while allowing the passage of casing between the flanges and roller bearing surfaces. Three rollers 51 are illustrated in the present embodiment by way of example. While a different number can be used, three bearings and three cooperating flattened portions 59 are particularly useful in quickly and reliably engaging the chuck with the end of the casing stick. Quick reliable engagement is necessary because the stick loading cycle should be accomplished as rapidly as possible, typically in a matter of a few seconds. While the roller chuck 23 is stationary when first engaged by the flange 52, once the stick is chucked up, the chuck 23 is rapidly accelerated to a speed on the order of 1,000 rpm. Furthermore, immediately on completion of the chucking-up cycle, the sliding valve 55 which controls emulsion flow is opened, such that emulsion immediately beings flowing through the core for discharge. Thus, there is no time available to carefully assure that all elements are properly engaged before commencing the next machine cycle, and, if the elements don't engage properly, a casing failure is likely.

The triangular configuration of rollers on the roller chuck and the complementary flattened portions on the core flange accomplish the required quick engagement in a reliable manner. In addition, the emulsion flowing through the tube and into the closed end of the casing forces the casing stick toward the roller chuck, providing positive engagement between the flattened portions of the flange and the rollers, thereby to effect an emulsion seal across the roller surface. The non-flattened portions of the flange define an imaginary circle which has a circumference approximately equal to the inflated circumference of the associated casing. Accordingly, the non-flattened portions of the flange cooperate with the roller bearing portions acting on the flattened portions to effect a continuous emulsion seal, preventing backflow of emulsion behind the flange. Finally, the rollers perform a function in reducing friction to assist the passage of the casing through the nip created between the roller and the flattened portion of the flange.

Returning to FIG. 5, there is illustrated the casing article engaged by the roller chuck as described in detail above. In addition, there is shown the discharge 22 which performs multiple functions including supplying emulsion to the core, supporting the core for rotation, and effecting a rotating emulsion seal. More particularly, there is shown a bearing carrier 61 having affixed therein an annular bearing 62 whose bearing surface supports the aft end of the tube 30a. A gland seal 63, inboard of the annular bearing 62, creates a rotational emulsion seal preventing emulsion flow between the rotating tube and stationary seal. Thus, when the sliding valve is translated to the operating position illustrated in FIG. 5, emulsion flow commences immediately through the conduit 54 and into the bore of the rotating cored casing article, for passage through the tubular core thereof, to deshirr and stuff the casing to form a plurality of links, a portion of a link being illustrated at 68. It will be appreciated that engagement of the casing article with both the roller chuck and the aft seal arrangement is automatically accomplished upon translation of the bearing carrier from the retracted to the operating position, and such automatic loading is assisted by the adjustable grooves in the carrier which align the axes of the core and stuffing machine, and by the reliable engagement effected by the rotating chuck and complementary flanged core, on the one hand, and the core aft end and emulsion discharge on the other. Furthermore, because the sliding valve which controls emulsion flow is opened immediately at the completion of the chucking up cycle, the casing article must immediately be in condition to pass emulsion and produce links at a very rapid rate. Typically, a complete casing article is expended in several minutes or less, and a new one must be chucked up in a matter of seconds to accommodate the highly efficient operations using this type of stuffing machine.

It is usually desirable to provide an end-of-casing sensor to signal the machine to withdraw the reciprocatable discharge and thereby terminate emulsion supply by closing of the sliding valve 55. To that end, the bearing carrier 61 is carried by a pair of rods 64 and is spring loaded toward the casing stick. A surface bearing 65 is disposed to contact the end of the casing supply. The surface bearing 65 is of material which minimizes friction between the casing and bearing, to allow rotation of the casing supply against the bearing without harming the casing. However, since the bearing carrier 61 is spring-biased toward the casing, when the casing supply is depleted, the bearing carrier will move toward the right to actuate a switch (not shown) to signal the machine to terminate emulsion flow. Such end-of-casing sensor apparatus as well as casing retention means are described and claimed in concurrently filed Nausedas application Ser. No. 481,034, to which the reader is referred for additional detail.

In typical operation, the cored casing article will be rotated at approximately 1,000 rpm. Considering that the core material is rigid PVC (polyvinyl chloride), but the wall thickness is only about 0.025 inches, it has been found that the approximately 2 foot long tube tends to "whip" as it is being rotated. In practicing one aspect of the invention, means are provided to allow the tube to freely rotate under control of the chuck, but to minimize whipping. In the exemplary embodiment, the carrier includes a plurality of axially extended support arms 70 affixed to the opposed discs 34, 35 near and on either side of the notches 32. The support arms are thus slightly out of contact with the casing article in the stuff position, but are effective to minimize vibration or whipping of the article as it is rotated by the chuck. Similarly, the arcuate guides 49 also assist in minimizing vibration and whipping. Thus, while the article is in a position to freely rotate under the control of the rotating chuck, means are provided to accommodate the non-rigid nature of the disposable stuffing tube to assure trouble-free operation.

Upon depletion of the casing supply, means are actuated for positively removing the spent casing core from the stuff position, then passing the core to a further position for recovering the meat emulsion within the core. Referring to FIGS. 1 and 2, there are shown a pair of deflector fingers 70a, 70b carried on a common shaft 71 supported for rotation in the end plates. Normally, during the stuffing cycle, the deflector fingers are maintained in the solid line position illustrated in FIG. 2 in which they are slightly out of contact with the casing stick in the stuff position. Immediately upon detection of imminent depletion of the casing supply, the emulsion pump is shut off and the sliding valve and the attached withdrawable discharge outlet begin to move to the retracted position. In order to minimize the amount of emulsion which escapes the stuffing operation, means are provided for wiping the still-encased flange end of the core to effect a break in the emulsion which would otherwise tend to string out of the casing and core for possible deposit on the machine. To that end, one of the deflector fingers 70a is positioned immediately adjacent the rotating chuck, such that when it is actuated (see FIG. 9) it wipes the flange of the core across the decelerating but still rotating chuck to break the string of emulsion inside the casing, thereby preventing the trailing of emulsion onto the machine as the linker pulls the trailing end of empty casing off of the core and through the chuck. For purposes of bringing the deflectors 70a, 70b into operative position, drive means such as a cylinder 72 (FIG. 2) attached to operating arm 73 serve to rotate the shaft from the nonoperated to the operated position. It will be appreciated that the carrier 25 has not yet begun to index at the time the deflector fingers are actuated, and accordingly, the spent core remains within the confining notches 32. In that condition, advantage is taken of the non-rigidity of the core, to accomplish the wiping action promptly by allowing the deflector 70a to introduce a slight bending into the core. Similarly, deflector 70b is actuated by rotation of the shaft 71 for forcing the core upwardly into the notch after the discharge 22 releases the aft end of the tube.

Figure 9:
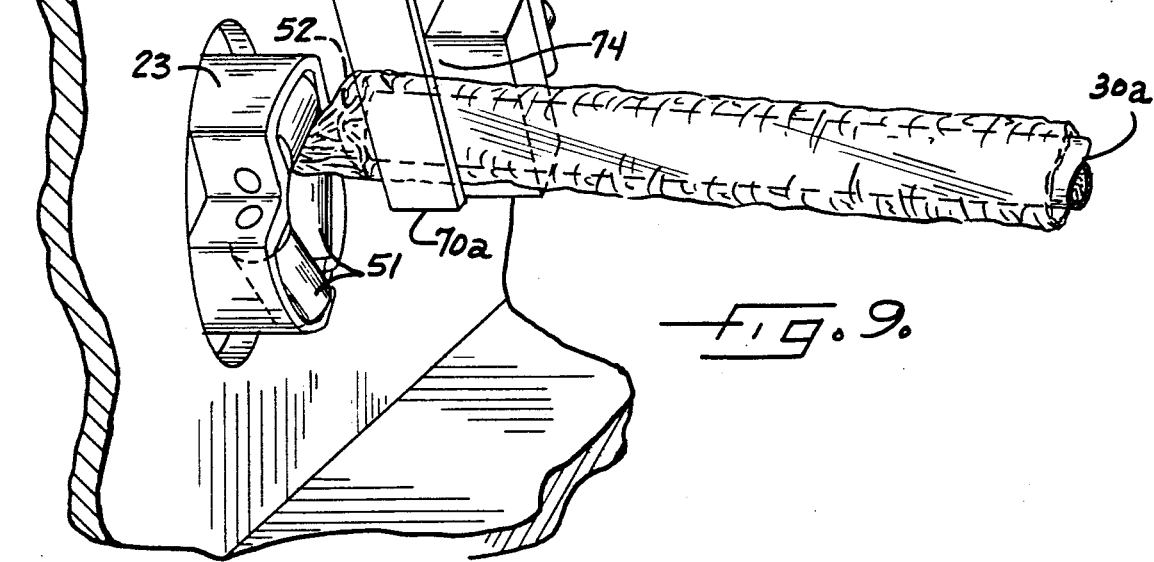
FIG. 9 is a partial view showing the core deflector operation.

The withdrawal of the discharge outlet from the aft end of the core is assisted by capturing the flange 52 at the fore end of the core by a flange engaging stop 74 (see FIG. 9, showing chuck 23 from the back of the machine for purposes of clarity). Thus, when the deflector finger 70a wipes the tube across the chuck, it also forces the flange 52 behind the flange-engaging stop 74, such that withdrawal of the discharge 22 will not simply carry the core rearwardly, but will positively disengage the discharge from the core, whereupon deflector finger 70b will force the rear end of the tube snugly within its associated notch. At that time, the carrier 25 is indexed 120 degrees to locate a fresh casing stick in the stuff position and to carry the expended core to a strip position.

It will be appreciated that it is conventional in stuffing food products such as emulsions to use a permanent stuffing horn which need be cleaned out only at the end of the day or at the end of a stuffing operation. Using the disposable stuffing horn of the present invention requires attention to be given to recovering the emulsion remaining within the spent core for rework. Realizing that literally hundreds of casing sticks can be consumed in a single day at one plant, it will be appreciated that this stuffing system would tend to lose much of its practical attractiveness without an efficient and trouble-free means of recovering the emulsion from the cores of spent casing articles before discarding the cores.

According to this aspect of the invention, a third station is provided on the carrier and in the machine, known as the strip position 28. With the spent core 30a indexed into the strip position, means are provided for automatically removing the emulsion from the core, and such means are operated while the new core indexed into the stuff position is being expended. Thus, without increasing the machine cycle time in any way, the spent core is stripped of emulsion prior to being discarded.

Referring to FIGS. 1 and 2, it is seen that there are provided a plurality of generally horizontal spring loaded fingers 80 which engage the spent core as it is indexed away from the still-actuated deflector fingers 70a, 70b, and which retain the spent core within the associated grooves as indexing continues. Cooperating with the horizontal supports 80, and with the opposed discs 34, 35 are a pair of positioner bars 81 carried on a pivotable shaft 82 which is spring-loaded to force the positioner bars 81 into the reduced diameter section between the discs 34, 35. As indexing of the carrier continues, the spent core ultimately encounters the base portion 84 of the positioner bars 81. The bars 81 deflect to the left as viewed in FIG. 2, positively restraining the spent core within the lower section of the grooves 32. To further assist positive positioning in the strip position, the positioner bars 81 have an upper hooked portion 85 which engages the core about a significant portion of its periphery when the carrier reaches the strip position, as best shown in FIG. 2. When the carrier reaches that position, a new casing article is automatically fed to the portion of the carrier in the load position, and the casing article which had been indexed to the stuff position is automatically chucked up and stuffing is commenced, all as described above. In addition, the spent core in the strip position is automatically restrained with its axis in alignment with the axis of a relatively long stroke cylinder (not shown) having a cylinder rod 90 (FIGS. 10 and 11) which projects through the left end plate 20. Actuation of the cylinder causes the rod 90 to move toward the right, which carries a self-centering core positioner 91 from a recess in the end plate 20 into contact with the left end of the spent core. The interior of the self-centering core positioner is concave such that the axis of the rod is thereby aligned with the axis of the core. Continued travel of the rod 90 causes the flanged end of the core to engage a similar self-centering core positioner 92 disposed in the right-hand end plate 21. This core positioner has an aperture 93 which allows passage of the emulsion through the end plate 21 where it can be collected in a container 94.

After the core is properly aligned by the self-centering core positioners, a piston 95 carried on the end of rod 90 and having an 0-ring 96 peripherally disposed, projects through the left-hand self-centering core positioner 91 and enters the core. Continued extension of the rod 90 causes the piston 95 to strip the emulsion out of the core 30a as the O-ring 96 wipes the inside surface of the core, forcing all of the emulsion through the aperture 93 in the right-hand core positioner 92 and into the container 94. At appropriate times during the course of the day, the emulsion in the container can be reworked, i.e., reused with the next batch of emulsion.

After the piston has traveled the length of the spent core, the cylinder is reversed and the piston retracted. The spent and empty core is held in the strip position for the remainder of the cycle needed to deplete the casing supply. Thereupon, a new indexing cycle is initiated at which time, in addition to all of the operations described above, the spent and emptied core is rotated free of the positioner bars 81, ultimately contacting stripper fingers 98 which deflect the spent and emptied core from its notches to a ramp 99 for collection in a container (not shown) for disposal.

It will now be appreciated that what has been provided is an improved stuffing apparatus for high speed production of linked sausages such as frankfurters. By eliminating the permanent stuffing horn and utilizing cored high density casing, an integral multiple of "smoke stick length" links of sausages can be produced. As a result, tie-off and stripping time and labor are reduced by an integral multiple. In addition, a plurality of smoke sticks can be transported to the smoke house at one time, further saving time and labor. The result can be the production of a given number of pounds per hour required by a particular house with the use of one fewer stuffing machine. In addition, horn seizures, coherence problems, horn fit problems, as well as problems associated with broken and crooked sticks are completely eliminated. The apparatus disclosed in the present application accomplishes automatic feeding of the casing stick and automatic positioning in both the stuff and strip positions, thus not only allowing the highly automated stuffing desirable for such high production machines, but also at the same time recovering the emulsion from the spent core prior to disposal thereof. While the most significant advantages flow from using the invention with cored high density casing, to which attention has been directed, some of the benefits can still be achieved using other forms of shirred casing disposed on a core; it is intended to cover all of said modified uses which fall within the spirit and scope of the appended claims.

I claim:

1. In a stuffing apparatus for producing linked sausages such as frankfurters, said stuffing apparatus having a rotating chuck and a linker for linking the sausages, the improvement comprising, apparatus for accommodating a cored casing article having a disposable stuffing horn carrying a supply of shirred casing, said apparatus having a discharge outlet for food product axially aligned with but spaced from the rotating chuck by a distance capable of accommodating a cored casing article, a carrier between the rotating chuck and discharge outlet, means on the carrier for accommodating a cored casing article and defining a casing article axis position with respect to the carrier, means for positioning the carrier with the casing article axis position along the axis of the chuck and discharge outlet, engagement means for reducing said distance between the discharge outlet and the rotating chuck to define a stuff position adapted to engage a cored casing article, drive means on the rotating chuck adapted to drivingly engage a cored casing article at its fore end for rotation, the drive means being adapted to allow passage of casing between the drive means and an engaged cored casing article, and means at said discharge outlet adapted to provide a bearing and emulsion seal between the discharge outlet and an engaged cored casing article.

2. The improvement as set out in claim 1 further including stripper means adapted to strip food product from the interior of a disposable stuffing horn after the casing supply is expended.

3. The improvement as set out in claim 2 wherein the stripper means includes a piston and self-centering means for engaging and positioning a disposable stuffing horn to receive said piston.

4. The improvement as set out in claim 1 wherein the carrier comprises an indexable carrier having a plurality of positions, and at least two article holding means at each position for receiving a casing article.

5. The improvement as set out in claim 4 further including adjustment means for varying the size of the article holding means to accommodate a range of casing article sizes.

6. The improvement as set out in claim 5 wherein the article holding means comprise notches having sharply inclined upper portions adapted to accommodate a cored casing article, and lesser inclined base portions adapted to accommodate an expended core.

7. The improvement as set out in claim 4 wherein the carrier has a load position, a stuff position, and a strip position, the load position being adapted to accept a new casing article, the stuff position being adapted to stuff casing on an accepted article, and the strip position being adapted to strip food product from the core of an expended article.

8. The improvement as set out in claim 4 wherein the carrier includes support means adapted to limit whipping of a casing article during rotation.

9. The improvement as set out in claim 1 wherein the rotating chuck includes at least three rollers rotatable as a set in a plane perpendicular to the chuck axis, said rollers adapted to engage mating portions on the fore end of a core of a casing article, thereby to rotate an engaged core while allowing passage of casing between an engaged core and the rollers.

10. The improvement as set out in claim 9 wherein the rotating rollers and an engaged mating portion of a core form a seal to minimize back flow of food product.

11. In a stuffing apparatus for producing linked sausages such as frankfurters, said stuffing apparatus having a rotatable chuck and a linker for linking the sausages, the improvement comprising (a) means adapted to supply a cored casing article, said article comprising a tubular core carrying a supply of shirred casing, (b) a discharge outlet for food product, axially aligned with, but spaced from the rotatable chuck by a distance capable of accommodating a cored casing article, (c) a carrier between the rotatable chuck and discharge outlet, (d) means on the carrier for accommodating a cored casing article and defining a casing article axis position with respect to the carrier, (e) means for positioning the carrier with the casing article axis position aligned with the axis of the chuck and discharge outlet, (f) engagement means, adapted to engage a cored casing article, and adapted for reducing said distance between the discharge outlet and the rotatable chuck to define a stuff position, (g) drive means on the rotatable chuck, adapted to drivingly engage a cored casing article at its fore end for rotation, the drive means being adapted to allow passage of casing between the drive means and an engaged cored casing article, and (h) means at the discharge outlet adapted to provide a bearing and emulsion seal between the discharge outlet and an engaged cored casing article.

12. The improvement as set out in claim 11 further including stripper means adapted to strip food product from the interior of a tubular core after the casing supply is expended.

13. The improvement as set out in claim 12 wherein said stripper means includes a piston and a self-centering means for engaging and positioning a tubular core to receive said piston.

14. The improvement as set out in claim 11 wherein said carrier comprises an indexable carrier having a plurality of positions, and having at least two article holding means at each position for receiving a cored casing article.

15. The improvement as set out in claim 14 wherein said carrier has a load position, a stuff position, and a strip position, the load position being adapted to accept a new cored casing article, the stuff position being adapted to stuff casing on an accepted cored casing article, and the strip position being adapted to strip food product from the core of an expended cored casing article.

16. The improvement as set out in claim 14 wherein said article holding means comprise notches having sharply inclined upper portions adapted to accommodate a cored casing article, and lesser inclined base portions adapted to accommodate an expended core.

17. The improvement as set out in claim 16 wherein said article holding means includes adjustment means for varying the size of the notches to accommodate a range of cored casing article diameters.

18. The improvement as set out in claim 17 wherein said article holding means includes means for holding the central axis of an engaged cored casing article in a fixed position relative to the notches, regardless of any size adjustment which is made in order to accommodate cored casing articles of varying diameters, thereby to maintain the casing article axis position aligned with the axis of the chuck and discharge outlet regardless of cored casing article diameter.

19. The improvement as set out in claim 11 wherein said carrier includes support means adapted to limit whipping of a casing article during rotation.

20. The improvement as set out in claim 19 wherein said support means are axially extending.

21. The improvement as set out in claim 11 wherein said rotatable chuck includes mating means, said mating means being adapted to engage mating portions on the fore end of a core of a casing article, thereby to rotate an engaged core while allowing passage of casing between an engaged core and the mating means.

22. The improvement as set out in claim 21 wherein said mating means and an engaged mating portion of a core form a seal to minimize back flow of food product.

23. The improvement as set out in claim 21 wherein said mating means includes rollers rotatable in a plane perpendicular to the chuck axis, said rollers adapted to engage mating portions on the fore end of a core of a casing article, thereby to rotate an engaged core while allowing passage of casing between an engaged core and the rollers.

24. The improvement as set out in claim 23 wherein said rotating rollers and an engaged mating portion of a core form a seal to minimize back flow of food product.

25. The improvement as set out in claim 11 including means to pass the fore end of the core across the rotating chuck at the end of stuffing, thereby to break the string of food product within the casing.

26. Method for producing linked sausages such as frankfurters, which comprises:
(a) mounting a cored casing article onto a stuffing apparatus having a food product discharge, a rotatable chuck and a linker for linking sausages, said article comprising a tubular core carrying a supply of shirred casing;
(b) sealably engaging the aft end of said cored casing article at said food product discharge, and rotatably and sealably engaging the fore end of said article at said rotatable chuck;
(c) rotating said chuck and said cored casing article while passing a food product through the tubular core and into the casing at the fore end;
(d) passing stuffed casing through the rotating chuck and into the linker, thereby producing linked sausages;
(e) sensing imminent casing depletion and ceasing the passage of food emulsion; and,
(f) passing the fore end of the tubular core across the rotating chuck to break the string of food product within the casing, thereby to prevent the trailing of food product onto the stuffing apparatus as the trailing end of empty casing is pulled off of the core and through the chuck by the linker.

27. Method for producing linked sausages such as frankfurters, which comprises:
(a) loading a cored casing article into carrier means of a stuffing apparatus, said apparatus having a food product discharge, a rotatable chuck and a linker for linking sausages, and said article comprising a tubular core carrying a supply of shirred casing;
(b) indexing the carrier means to bring the cored casing article from a casing loading position to a casing stuffing position;
(c) sealably engaging the aft end of said cored casing article at said food product discharge, and rotatably and sealably engaging the fore end of said article at said rotatable chuck;
(d) rotating said chuck and said cored casing article while passing a food product through the tubular core and into the casing at the fore end;
(e) passing stuffed casing through the rotating chuck and into the linker, thereby producing linked sausages;
(f) sensing imminent casing depletion and ceasing the passage of food emulsion;
(g) ceasing chuck rotation and disengaging the casing depleted tubular core from said chuck and said food product discharge;
(h) indexing the carrier means to bring the casing depleted tubular core into a core stripping position; and,
(i) engaging said core with stripping means under conditions sufficient to remove all food product from the bore of said tubular core.

28. The method of claim 27 including an additional step after step (f) and before step (g), which comprises passing the fore end of the tubular core across the rotating chuck to break the string of food product within the casing, thereby to prevent the trailing of food product onto the stuffing apparatus as the trailing end of empty casing is pulled off of the core and through the chuck by the linker.

29. In a stuffing apparatus for producing linked sausages such as frankfurters, said stuffing apparatus having a rotatable chuch for engaging and rotating stuffed casing and a linker for forming individual linked sausages from the rotating stuffed casing, the improvement comprising:
(a) apparatus for accommodating a cored casing article, said article having a tubular core member carrying a supply of shirred casing and said apparatus having a discharge outlet for food product axially aligned with, but spaced from, the rotatable chuck by a distance capable of accommodating said cored casing article;
(b) a carrier located between the rotatable chuck and discharge outlet,
(c) holding means on said carrier for accommodating said casing article, said holding means defining a casing article axis position with respect to said carrier, and said holding means being adapted to accommodate both said casing article and said core member when the casing carried thereby is exhausted by a stuffing operation;
(d) means for indexing said carrier between
(i) a load position wherein said casing article is loaded onto said carrier, and
(ii) a stuff position wherein the core of said casing article is axially aligned with said discharge outlet and said rotatable chuck;
(e) engagement means adapted to reduce the distance between said discharge outlet and rotatable chuck for engaging a cored casing article held on said carrier and communicating one end of the tubular core thereof with said discharge outlet;
(f) drive means adapted to drivingly engage and rotate the tubular core of said cored casing article when said article is in said stuff position; and
(g) seal means at said discharge outlet for establishing an emulsion seal between said discharge outlet and the end of said tubular core communicated to said discharge outlet.

30. Stuffing apparatus as in claim 29 wherein said carrier includes adjustment means for varying the size of said article holding means to accommodate a range of cored casing article diameters.

31. A stuffing apparatus as in claim 29 wherein said carrier includes a pair of discs arranged in a face-to-face relationship, each of said discs having a notch therein and said notches being associated so that each notch provides a side of said holding means.

32. A stuffing apparatus as in claim 31 including means for adjusting one of such discs with respect to another for changing the size of said holding means.

33. A stuffing apparatus as in claim 29 wherein said holding means comprises notches in said carrier, each of said notches having sharply inclined portions adapted to accommodate a cored casing article, and lesser inclined portions for accommodating the core member of said article after the supply of casing carried thereby is exhausted.

34. A stuffing apparatus as in claim 33 wherein said carrier comprises a pair of discs arranged in a face-to-face relationship, each of said discs having one of said notches therein and said discs being arranged with said notches aligned so that each notch forms a side of said holding means.

35. A stuffing apparatus as in claim 34 including means for adjusting one of said discs with respect to another for varying the size of said holding means.

36. A stuffing apparatus as in claim 29 wherein said carrier has a longitudinally spaced pair of said holding means, said spaced pair of holding means being axially aligned to define said article axis position.

37. A stuffing apparatus as in claim 29, including a casing article holding means on said carrier at each of said load and stuff positions so that one casing article can be received by said carrier at said load position while a second casing article is at said stuff position.

38. Stuffing apparatus as in claim 29, including a plurality of said holding means arranged at spaced intervals each of said holding means defining in sequence, on said carrier, a load position, said stuff position and a strip position, and said carrier being indexable from said load position, where one of said casing articles is loaded onto said holding means, to said stuff position where stuffing of the casing on said casing article occurs, and then to said strip position where food emulsion is removed from said core member of said casing article.

* * * * *